INVENTOR.
Yves M. Ponsar
BY
Dressler, Goldsmith, Clement & Gordon
ATTORNEYS

United States Patent Office 3,420,258
Patented Jan. 7, 1969

3,420,258
APPARATUS FOR CONTROL OF LIQUID FLOW
Yves M. Ponsar, 6 Ave. Marcelin Berthelot,
93 Villemomble, France
Filed May 19, 1966, Ser. No. 551,346
Claims priority, application France, May 22, 1965,
18,056; May 4, 1966, 60,190
U.S. Cl. 137—209                     10 Claims
Int. Cl. B67d 5/54

ABSTRACT OF THE DISCLOSURE

The apparatus is adapted to control flow of liquid between elevationally spaced liquid bodies. The preferred embodiment comprises a passageway such as that in a siphone or ejector wherein the flow of liquid extracts air from the passage and creates a vacuum. The liquid flow through this passageway is controlled to provide constant flow or to provide a constant liquid level for either the elevationally higher or lower of the spaced liquid bodies. The passageway is provided with valve means associated with the head space thereof adapted to admit atmospheric air to said space under predetermined conditions and thereby to change the total hydraulic head operating to cause liquid flow through the passageway by reducing the vacuum portion thereof which is induced by liquid flow through the passageway. The valve opens and shuts in response to movement of a piston which is in balance at present pressure conditions acting downwardly in opposition to upwardly acting gas pressure within the head and moves in response to changes in gas pressure within the passageway head space.

---

The present invention has for its object an apparatus for controlling the conditions of liquid flow between an upstream liquid level and a downstream liquid level, either for the purpose of maintaining or limiting the rate of flow at a constant value, or in order to modify this flow-rate in order to regulate a constant level, for example the upstream level or the downstream level or a relation between these two, or again in order to take account of one or more factors on which depend the desired conditions of operation of the installation.

The apparatus according to the invention is especially characterized in that it comprises a first gas chamber means having a first gas intake, a liquid passage way between the two levels passing through the said first gas chamber means and extracting gas from the said first gas chamber in order to convey it in the form of bubbles to the downstream level, valve means co-operating with said first gas inlet for controlling a first gas flow permitted to pass into the said first gas chamber through the said first gas inlet so as to be discharged in the form of bubbles towards the downstream level, a second gas chamber means having a second gas inlet, conduit means between the second gas chamber and the first gas chamber so as to direct a second gas flow from the second gas inlet to the first gas chamber so as to be discharged in the form of bubbles to the downstream level, head loss means in the said conduit means to ensure that the gas pressure is higher in the second gas chamber than in the first gas chamber, piston means rigidly fixed to said valve means and comprising oppositely-acting first and second working faces, the first working face being exposed to the pressure of the first gas chamber, the second working face being exposed to the pressure of the second gas chamber, the section of the second working face being at least equal to the section of the first working face so that the gas pressure, higher in the second gas chamber than in the first gas chamber, tends to displace the said piston means in the direction of opening of the said valve means, and balancing means applied to the said piston means and tending to displace said piston means in the direction of closure of the said valve means, so as to stabilize the flow-rate of gas admitted to said first gas chamber and discharged in the form of bubbles to the downstream level and in consequence, the flow-rate of liquid from the upstream level through said liquid passageway towards the downstream level.

In one form of construction, the balancing means consist of putting under pressure a third gas chamber to which is exposed a third working face of the piston means, while in an alternative form the balancing means are mechanical and comprise, for example, a pulley, a cable passing over the pulley and having one extremely coupled to the piston means while the other extremity of the cable receives a counterweight.

The head loss means may comprise a hollow tube coupled to the second gas chamber and passing into the liquid level of a bell having a gas space forming part of the first gas chamber. The head loss means may comprise a reduced or throttled section, adjustable or not, for example a gate-valve in the conduit means coupling together the first and second gas chambers.

The second gas inlet of the second gas chamber may comprise a valve means.

When the third gas chamber is provided, the regulation of the installation can be carried out by keeping constant or by varying the pressure of the third gas chamber in order to maintain the flow-rate of liquid constant or to maintain a constant level, etc.

The regulation can also be effected by acting on the valve of the second gas inlet.

It is furthermore possible to modulate the adjustment by acting on the head loss means of the conduit coupling the first and second gas chambers.

The objects, characteristic features and advantages of the invention will be further brought out in the description which follows below of forms of embodiment chosen by way of example, reference being made to the accompanying drawings, in which.

Figure 3:
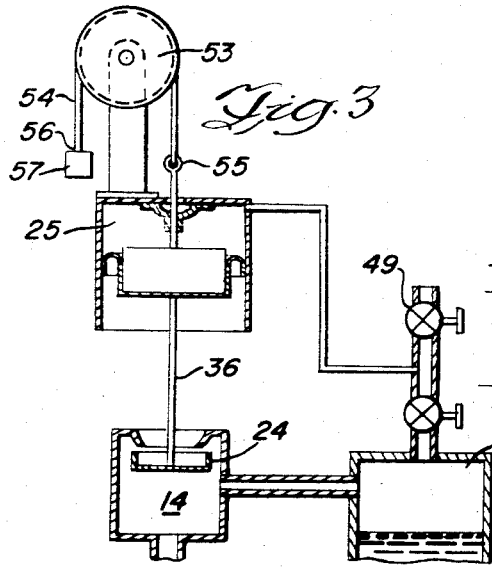

FIG. 3 relates to another alternative form of embodiment.

Figure 1:
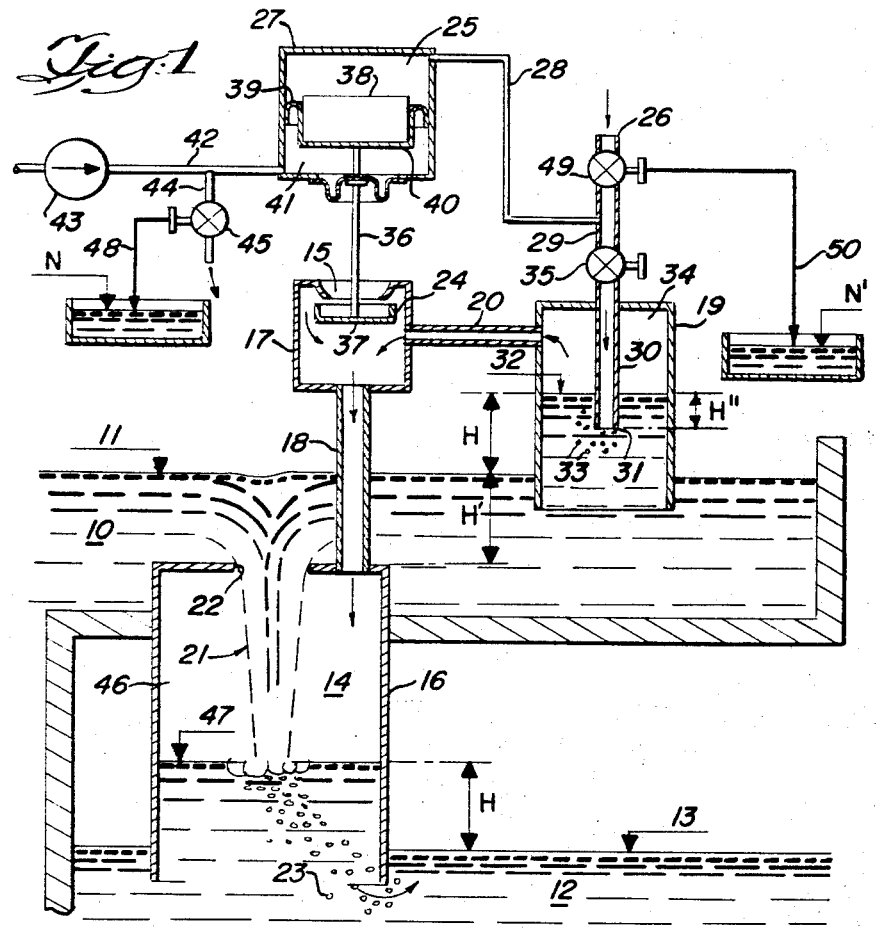
FIG. 1 is a diagrammatic view in vertical section of an apparatus according to the invention.

Reference will first be made to FIG. 1, in which there is shown at 10 an upstream expanse of liquid having an upstream level 11, and at 12 a downstream expanse of liquid having a downstream level 13. An apparatus according to the invention, such as that shown in FIG. 1, is intended to control the flow conditions of liquid between the upstream level 11 and the downstream level 13. This apparatus comprises a first gas chamber 14 which has a first air inlet 15 forming a communication between the said chamber 14 and the atmosphere.

In the example shown in FIG. 1, the gas chamber 14 is defined by a bell 16 which is immersed in the downstream level 13 by a box 17 which comprises the inlet 15, by a conduit 18 coupling together the bell 16 and the box 17, by a bell 19 which is plunged into the upstream level 11, and by a conduit 20 coupling together the box 17 and the bell 19. It will be noted that the assembly 16, 17, 18, 19, 20, defining the gas chamber 14, may have any appropriate shape, such as for example the shape of a single general bell.

A liquid passageway 21 is formed between the level 11 and the level 13 and passes through the gas chamber 14. This passageway is of the overflow type and comprises for example an orifice 22 at least partly submerged in the upstream expanse of liquid 10. The flow of liquid at 21 extracts air from the chamber 14 and carries it away in the form of bubbles towards the downstream level 13, thus playing the part of a vacuum pump.

A valve 24 cooperates with the first inlet 15 and controls a first flow of air permitted to pass into the first chamber 14 by the first inlet 15, so as to be discharged in the form of bubbles 23 to the downstream level 13.

The apparatus also comprises a second gas chamber 25 having a second air inlet 26 which connects the said chamber 25 to the atmosphere.

In the example shown in FIG. 1, the gas chamber 25 is defined by a box 27 and by a conduit 28 coupled to the inlet 26.

A conduit means 29 is provided between the second gas chamber 25 and the first gas chamber 14, so as to direct a second flow of air from the second air inlet 26 to the first chamber 14 in order to be discharged in the form of bubbles 23 to the downstream level 13.

In the example shown in FIG. 1, the conduit means 29 comprises a hollow, substantially vertical tube 30, the lower extremity 31 of which is open and dips into the liquid level 32 of the bell 19 so that the air entering at 26 passes in the form of bubbles 33 from the extremity 31 to the gas space 34 of the bell 19 which forms part of the first chamber 14. The tube 30 immersed at 31 constitutes a pressure-loss means which causes the gas pressure to be higher in the second chamber 25 than in the first chamber 14.

The conduit means means 29 further comprises another pressure-loss means constituted by a gate-valve 35. A piston means 36 is rigidly fixed to the valve means 24 and comprises a first working face 37 and an oppositely-acting second working face 38. The first working face 37 is exposed to the pressure of the first chamber 14, while the second working face 38 is exposed to the pressure of the second chamber 25. The section of the face 38 is equal to or greater than the section of the face 37, so that the gas pressure, higher at 25 than at 14, tends to displace the piston means 26 in the direction of opening of the valve 24.

In the example shown in FIG. 1, the piston means 36 is adapted to move along a vertical direction, and the valve 24 is adapted to close when the piston means 36 moves upwards and to open when the piston means 36 moves downwards. It will be noted that the face 37 is directed downwards while the face 38 is directed upwards.

The piston means 36 can be arranged and shaped in any apropriate manner and comprises for example a bellows 39 in the form of a glove finger 39 which is interposed between the box 27 and the piston means 36, and which ensures both the assembly and the fluid-tightness of the said piston means 36.

Balancing means are applied to the piston means 36 and tend to displace the latter in the direction of closure of the valve 24. In the example shown in FIG. 1, the piston means 36 comprises a third face 40 exposed to the pressure of a third chamber 41. The latter is defined by the bellows 39 in the box 27 and is coupled to a conduit 42 which is supplied by an air compressor 43 and which comprises a discharge connection 44 provided with a pressure-loss means such as a gate-valve 45. When the valve 45 is sufficiently closed, the air compressor 43 produces in the third chamber 41 a pressure tending to lift the piston means 36 in such manner as to balance the flow of air admitted to the first chamber 14 and discharged in the form of bubbles 23 towards the downstream level 13 and consequently, the flow of liquid passing at 21 from the upstream level 11 to the downstream level 13.

There is thus maintained in the bell 16 a condition of total non-filling with liquid, that is to say a partial condition in which a gas space 46 forming part of the first gas chamber 14 is maintained in the bell 16 above a liquid level 47 in the said bell.

It will be noted that the pressure is the same everywhere in the first chamber 14, that is to say both at 34 and at 46. In consequence, the same difference of levels H exists between the level 47 and the level 13, and between the level 32 and the level 11.

There is designated by H' the difference of levels between the level 11 and the orifice 22 and by H" the difference of levels between the level 32 and the orifice 31.

The flow passing at 21 from 11 to 13 is proportional to the cross-section of the orifice 22 and to the square root of $H+H'$. It will be observed that the section of the orifice 22 is constant and that the height $H+H'$ is made up of the fixed height comprised between the orifices 31 and 22 and of the height H", that is to say, assuming the pressure loss at 35 to be constant, of the difference of pressures in the chambers 25 and 14.

Therefore, if the pressure at 41 which acts on the piston means 36 at the same time as this difference of pressures at 25 and 14 is constant, the flow-rate at 21 itself remains constant. If the pressure at 41 is varied, the flow-rate at 21 varies.

The apparatus which has just been described is thus adapted to operate in a balanced manner, and enables the conditions of liquid flow between the upstream level 11 and the downstream level 13 to be controlled, either for the purpose of maintaining the flow passing at 21 from 11 to 13 at a constant value, or in order to modify this flow-rate so as to regulate a constant level, or again in order to take account of one or more factors on which depend the desired conditions of operation of the installation.

In the example shown in FIG. 1, the gate-valve 45 forms a means for regulating the balancing means 43, 42 and 45, and permits the pressure in the third gas chamber 41 to be maintained constant or to be varied.

When the gate-valve 45 is kept at a constant opening, the pressure remains constant at 41 and the flow-rate of liquid passing at 21 from 11 to 13 is kept constant.

The degree of opening of the gate-valve 45 may also be servo-controlled through the intemediary of coupling means 48, by a level N so as to maintain the level N constant. This level N may either be the upstream level 11 or the downstream level 13, or again a relation between the levels 11 and 13.

In the form of embodiment shown in FIG. 1, the second air inlet 26 to the second gas chamber comprises a valve 49 adapted to regulate the flow of entering air.

When the valve 49 is kept at a constant opening, the difference of pressures at 25 and 14 remains constant, and if the pressure 41 is itself constant, the liquid flow at 21 is constant.

The degree of opening of the valve 49 can also be servo-controlled through the intermediary of coupling means 50 to a level N', so as to maintain constant the level N'. This level N' may be either the upstream level 11 or the downstream level 13, or the level N, or the relation between these levels. It should be noted that the pressure-loss means constituted by the gate-valve 35 enables the conditions of regulation to be improved and in particular provides a finer adjustment.

In FIG. 1, the two pressure-loss means, on the one hand 35 and on the other 30, are provided simultaneously, but one only of these may be sufficient, for example the gate-valve 35, the tube 30 being then dispensed with as has been shown in FIG. 3.

It will be appreciated furthermore that the submerged orifice 22 may be replaced by a weir with an overflow crest provided in a bell comprising the two bells 16 and 19.

Figure 2:
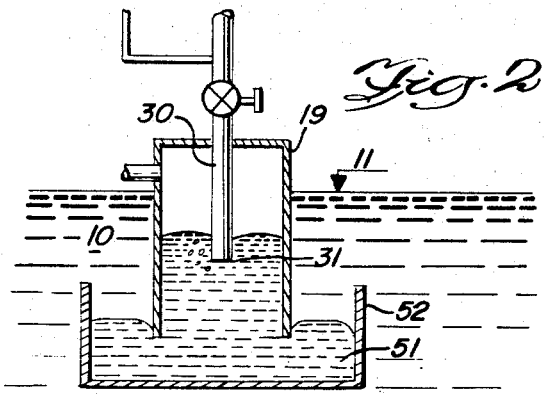
FIG. 2 is a view of a modified portion of this apparatus.

Reference will now be made to FIG. 2, in which a heavy auxiliary liquid 51, for example mercury, is arranged in a cup 52 which is immersed in the upstream level 11, while the bell 19 and the hollow tube 30 are plunged into the said heavy auxiliary liquid 51. This arrangement is intended to prevent impurities mixed with the liquid 10 from tending to block the orifice 31.

In the alternative form shown in FIG. 3, the third gas chamber 41 can be eliminated, and the balancing means for the piston means 36 comprise a pulley 53, a cable 54 passing over the pulley 53 and having one extremity 55 coupled to the piston means 36, while the other extremity 56 of the cable 54 receives a counterweight 57. In this case, the regulation of the installation is carried out by means of the valve 49 and/or 35.

What I claim is:

1. Apparatus for controlling the conditions of liquid flow between an upstream liquid level and a downstream liquid level, comprising a first gas chamber means having a first gas inlet, a liquid passageway between the two levels passing through said first gas chamber means and extracting gas from said first gas chamber in order to carry it away in the form of bubbles towards the downstream level, valve means co-operating with said first gas inlet for controlling a first gas flow permitted to pass into said first gas chamber through said first gas inlet, so as to be discharged in the form of bubbles towards the downstream level, a second gas chamber means having a second gas inlet, conduit means between the second gas chamber means and the first gas chamber means so as to direct a second gas flow from the second gas inlet to the first gas chamber in order to be discharged in the form of bubbles towards the downstream level, head-loss means in said conduit means to ensure that the gas pressure is higher in the second gas chamber than in the first gas chamber, piston means rigidly fixed to said valve means and comprising oppositely-acting first and second working faces, the first working face being exposed to the pressure of the first gas chamber, the second working face being exposed to the pressure of the second gas chamber, the cross-section of the second working face being at least equal to the section of the first working face, so that the gas pressure, higher in the second gas chamber than in the first gas chamber, tends to displace said piston means in the direction of opening of said valve means, and balancing means applied to said piston means and tending to displace said piston means in the direction of closure of said valve means so as to stabilize the flow-rate of gas admitted to said first gas chamber and discharged in the form of bubbles towards the downstream level and in consequence the flow-rate of liquid from the upstream level through said liquid passageway towards the downstream level.

2. Apparatus as claimed in claim 1, in which said piston means is adapted to move along a vertical direction, and said valve means is adapted to close when the piston means is moved upwards and to open when said piston means move downwards, the first working face exposed to the pressure of said first gas chamber being directed downwards, the second working face exposed to the pressure of the second gas chamber being directed upwards, the balancing means being adapted to apply an upwardly-directed force on said piston means.

3. Apparatus as claimed in claim 2, in which said balancing means comprise a pulley, a cable passing over said pulley and having one extremity coupled to said piston means while the other extremity of the cable receives a counterweight.

4. Apparatus as claimed in claim 1, in which said piston means comprises a third working face exposed to the pressure of a third gas chamber, and the balancing means comprise means for regulating the pressure in said third gas chamber.

5. Apparatus as claimed in claim 4, in which said regulating means are adapted to vary the pressure in the third gas chamber so as to vary the flow-rate of liquid from the upstream level through said passageway towards the downstream level.

6. Apparatus as claimed in claim 1, in which the second gas inlet to the second gas chamber comprises a second valve means in order to regulate the flow of gas passing through said second inlet.

7. Apparatus as claimed in claim 6, in which said second valve means is adapted to vary the flow of gas passing through said second inlet so as to vary the flow of liquid passing to the upstream level through said liquid passageway towards the downstream level.

8. Apparatus as claimed in claim 1, in which said first gas chamber comprises a bell means dipping into the upstream level and having a gas-space above a liquid level, while said head-loss means of said conduit means comprise a hollow substantially-vertical tube having an open lower extremity plunged into the liquid level of said bell means.

9. Apparatus as claimed in claim 8, in which a heavy auxiliary liquid is disposed in a bowl which is immersed in the upstream level, while the bell means and the hollow tube are plunged into said heavy auxiliary liquid.

10. Apparatus as claimed in claim 1, in which said head-loss means comprise a gate-valve means in said conduit means which couples the first gas chamber to the second gas chamber.

References Cited

UNITED STATES PATENTS 2,685,303   8/1954   Tolley _____ 137—453 X

FOREIGN PATENTS 1,367,596   6/1964   France.

ALAN COHAN, *Primary Examiner.*